United States Patent
Myers et al.

(10) Patent No.: US 10,991,002 B2
(45) Date of Patent: *Apr. 27, 2021

(54) SYSTEMS AND METHODS FOR SELECTING AN AD CAMPAIGN AMONG ADVERTISING CAMPAIGNS HAVING MULTIPLE BID STRATEGIES

(71) Applicant: Vungle, Inc., San Francisco, CA (US)

(72) Inventors: Raymond Myers, Foster City, CA (US); Daniel Kang, San Francisco, CA (US); Hammond Guerin, San Francisco, CA (US)

(*) Notice: Subject to any disclaimer, the term of this patent is extended or adjusted under 35 U.S.C. 154(b) by 20 days.

This patent is subject to a terminal disclaimer.

(21) Appl. No.: 15/991,351

(22) Filed: May 29, 2018

(65) Prior Publication Data

US 2018/0276708 A1    Sep. 27, 2018

Related U.S. Application Data

(63) Continuation of application No. 14/677,952, filed on Apr. 2, 2015, now Pat. No. 9,996,853.

(51) Int. Cl.
   *G06Q 30/02* (2012.01)
   *G06F 16/9535* (2019.01)
   *G06Q 30/08* (2012.01)

(52) U.S. Cl.
   CPC ..... *G06Q 30/0247* (2013.01); *G06F 16/9535* (2019.01); *G06Q 30/0242* (2013.01);
   (Continued)

(58) Field of Classification Search
   CPC .......... G06Q 30/02–0277; G06Q 30/08; G06F 16/9535; G06F 17/30867
   See application file for complete search history.

(56) References Cited

U.S. PATENT DOCUMENTS

| 5,974,398 A | 10/1999 | Hanson et al. |
| 6,571,279 B1 | 5/2003 | Herz |

(Continued)

FOREIGN PATENT DOCUMENTS

| KR | 20090063448 A | * | 6/2009 | ............. G06Q 30/02 |

OTHER PUBLICATIONS

Hedging and Cross-Hedging Long Term Industrial Bond Portfolios With Treasury Bond Futures by Shepperd, Marilyn A. Arizona State University, ProQuest Dissertations Publishing, 1986.*

(Continued)

*Primary Examiner* — Raquel Alvarez
(74) *Attorney, Agent, or Firm* — Jaffery Watson Mendonsa & Hamilton LLP

(57) ABSTRACT

Methods and systems are described for selecting an engaging ad campaign among advertising campaigns having different types of bid strategies. In one embodiment, an advertising system designed for selecting relevant and engaging ad campaigns for delivering to a device of a user includes an adaptive decision unit having filter logic for filtering eligible ad campaigns, a storage medium to store instructions of the system, and processing logic coupled to the storage medium. The processing logic is configured to execute the instructions of the system to receive and process an ad request from the device upon initiation of a software application on the device, filter eligible ad campaigns, convert each bid strategy of the filtered ad campaigns into an effective cost-per-mille (CPM) strategy, compare effective CPM strategies for the filtered ad campaigns, and select an ad campaign based on the comparison of the effective CPM strategies.

14 Claims, 9 Drawing Sheets

(52) U.S. Cl.
CPC ..... *G06Q 30/0243* (2013.01); *G06Q 30/0244* (2013.01); *G06Q 30/08* (2013.01)

(56) References Cited

U.S. PATENT DOCUMENTS

| | | |
|---|---|---|
| 7,035,812 B2 | 4/2006 | Meisel et al. |
| 8,561,104 B1 | 10/2013 | Dow |
| 9,501,777 B1 | 11/2016 | Liu |
| 2007/0198350 A1 | 8/2007 | O'Kelley et al. |
| 2011/0196733 A1 | 8/2011 | Li |
| 2012/0158456 A1 | 6/2012 | Wang et al. |
| 2013/0339126 A1 | 12/2013 | Cui et al. |
| 2014/0222587 A1 | 8/2014 | Feldman |
| 2015/0019359 A1 | 1/2015 | Swierczek |
| 2015/0213485 A1 | 7/2015 | Wang |
| 2016/0041998 A1 | 2/2016 | Hall |
| 2016/0092938 A1 | 3/2016 | Tang |
| 2016/0104207 A1 | 4/2016 | Zhao |

OTHER PUBLICATIONS

Gluck, Marissa, "IAB Ad Engagement", Radar Research, Dec. 5, 2012, 15 pages.

* cited by examiner

CANDIDATE AD CAMPAIGNS
500

| Advertiser | CPI Bid (Cost per install) | Predicted Conversion Rate | eCPM (~ Cost per 1k views) |
|---|---|---|---|
| AD CAMPAIGN 510 | $1.50 | PREDICTED CONVERSION RATE 512 | eCPM 514 |
| AD CAMPAIGN 520 | $2.00 | PREDICTED CONVERSION RATE 522 | eCPM 524 |
| AD CAMPAIGN 530 | $2.50 | PREDICTED CONVERSION RATE 532 | eCPM 534 |

FIG. 5

CANDIDATE AD CAMPAIGNS
600

| Advertiser | Bid | Rate Type | Conversion Rate | eCPM (~ Cost per 1k views) |
|---|---|---|---|---|
| AD CAMPAIGN 610 | $1.50 | CPI | PREDICTED CONVERSION RATE 612 | $7.20 |
| AD CAMPAIGN 620 | $0.008 | CPM | n/a | $8.00 |
| AD CAMPAIGN 630 | $0.01 | CPCV | PREDICTED CONVERSION RATE 632 | $7.20 |

FIG. 6

SYSTEMS AND METHODS FOR SELECTING AN AD CAMPAIGN AMONG ADVERTISING CAMPAIGNS HAVING MULTIPLE BID STRATEGIES

This application is a continuation of co-pending U.S. patent application Ser. No. 14/677,952, filed on Apr. 2, 2015, which is incorporated herein by reference.

FIELD OF THE INVENTION

Embodiments of the invention are generally related to systems and methods for selecting an engaging ad campaign among advertising campaigns having different types of bid strategies.

BACKGROUND

Mobile advertising is a form of advertising via mobile (wireless) phones or other mobile devices. Advertisements (ads) can be presented to the intended user in the form of banner ads, text boxes, and video ads. However, these ads may be difficult to distribute to a targeted user in a timely manner and the user may not be responsive and interested in the ads. Advertisers can create an advertising campaign as a series of advertisement messages that share a single idea and theme. The advertising campaigns appear in different media across a specific time frame. However, advertisers may lack the resources and expertise for effectively creating an ad campaign and delivering the ad campaign to mobile devices.

SUMMARY

Methods and systems are described for selecting an engaging ad campaign among advertising campaigns having different types of bid strategies. In one embodiment, an advertising system designed for selecting relevant and engaging in-application (in-app) ad campaigns for delivering to a device of a user includes an adaptive decision unit having filter logic for filtering eligible ad campaigns, a storage medium to store instructions of the system, and processing logic coupled to the storage medium. The processing logic is configured to execute the instructions of the system to receive and process an ad request from the device upon initiation of a software application on the device, filter eligible ad campaigns, convert each bid strategy of the filtered ad campaigns into an effective cost-per-mille (CPM) strategy, compare effective CPM strategies for the filtered ad campaigns, and select an ad campaign based on the comparison of the effective CPM strategies.

Other embodiments are also described. Other features of embodiments of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 5 illustrates an exemplary candidate ad campaign list for performance based ads in accordance with one embodiment.

FIG. 6 illustrates an exemplary candidate ad campaign list for different types of performance based bid strategies in accordance with one embodiment.

DETAILED DESCRIPTION

Figure 1:
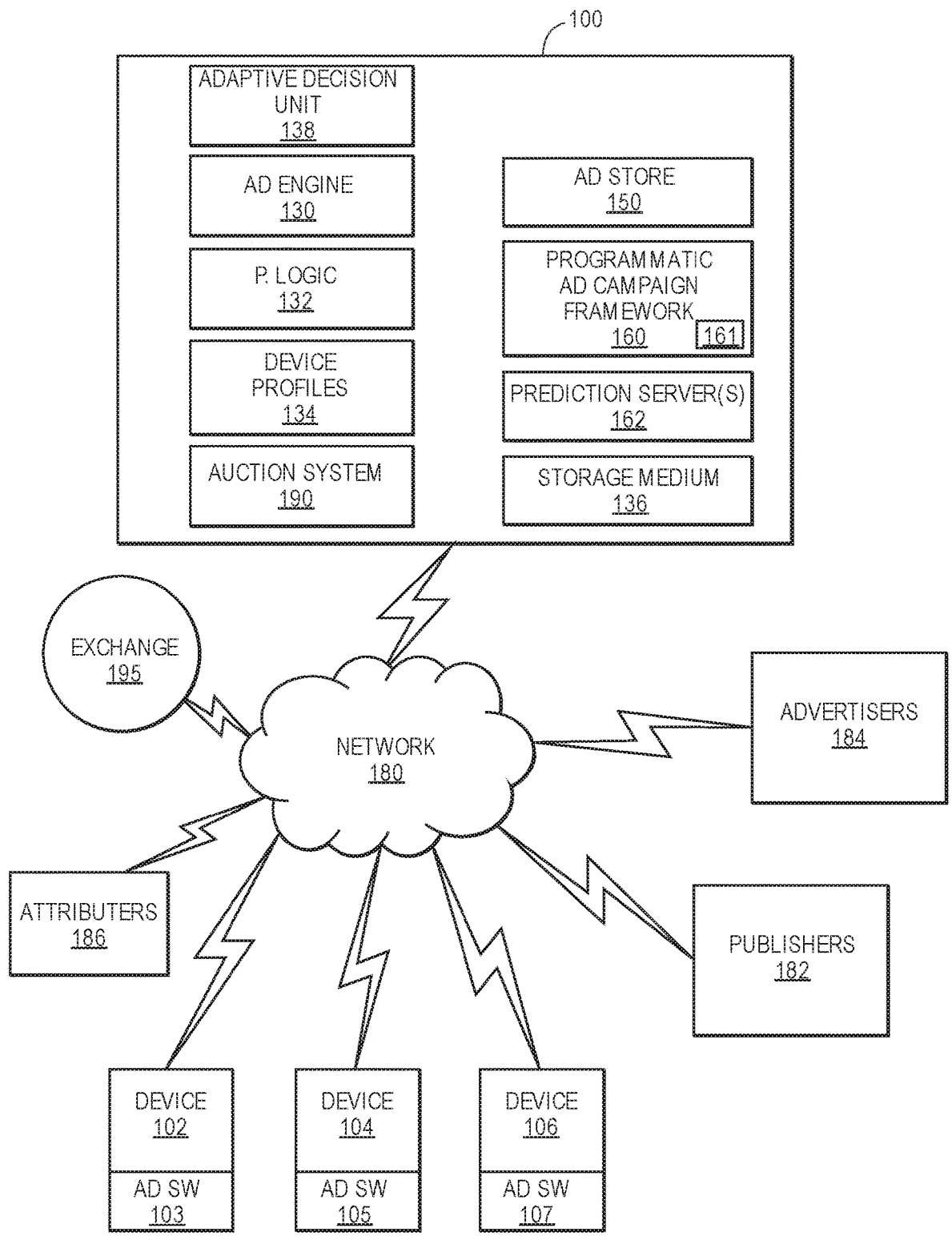
FIG. 1 shows an embodiment of a block diagram of a system 100 for selecting an ad campaign (e.g., a winning ad campaign) among advertising campaigns having different types of bid strategies in accordance with one embodiment.

Methods and systems are described for selecting an engaging ad campaign among advertising campaigns having different types of bid strategies. In one embodiment, an advertising system designed for selecting relevant and engaging ad campaigns for delivering to a device of a user includes an adaptive decision unit having filter logic for filtering eligible ad campaigns, a storage medium to store instructions of the system, and processing logic coupled to the storage medium. The processing logic is configured to execute the instructions of the system to receive and process an ad request from the device upon initiation of a software application on the device, filter eligible ad campaigns, convert each bid strategy of the filtered ad campaigns into an effective cost-per-mille (CPM) strategy, compare effective CPM strategies for the filtered ad campaigns, and select an ad campaign based on the comparison of the effective CPM strategies.

An auction system provides a mechanism for third party participants to bid on providing advertising services including in-application (in-app) advertising services to the device in response to an actual or predictive ad exchange request. The auction system captures demand for providing advertising services in real time or near real time prior to the actual or the predicted ad play event on the device.

In mobile video advertising, high performing campaigns are needed for advertisers, publishers, and users of the publishers. Advertisers include organizations that pay for advertising services including ads on a publisher network of applications and games. Publishers provide content for users. Publishers can include developers of software applications, mobile applications, news content, gaming applications, sports news, etc. The publishers are interested in generating revenue through selling ad space to be on displayed in video ads to their users.

Performance can be defined in terms of click-through rates (CTR), conversion rates, and video completion rates. The process in which a user selects an ad is referred to as a click-through, which is intended to encompass any user selection. The ratio of a number of click-throughs to a number of times an ad is displayed is referred to as the CTR of the ad. A conversion occurs when a user performs a transaction related to a previously viewed ad. For example, a conversion may occur when a user views a video ad and installs an application being promoted in the video ad. A conversion may occur when a user views a video ad and installs an application being promoted in the video ad within a certain time period. A conversion may occur when a user is shown an ad and decides to make a purchase on the advertiser's web site within a certain time period. The ratio of the number of conversions to the number of times an ad is displayed is referred to as the conversion rate. A video completion rate is a ratio of a number of video ads that are displayed to completion to a number of video ads initiated on a device. Advertisers may also pay for their ads through an advertising system in which the advertisers bid on ad placement on a cost-per-click (CPC), cost-per-mille (CPM), cost-per-completed-view (CPCV), cost-per-action (CPA), and/or cost-per-install (CPI) basis. A mille represents a thousand impressions on users' devices. In one example, CPA is defined by an advertiser. CPA is an advertising pricing model in which the advertiser pays for each specified action (e.g., impression, click, form submit, opt-in, sale, etc.). The advertiser determines the desired action. For in-app purchases, actions may include software application installs, purchases, finishing a tutorial, and completing a certain percentage of a software application.

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

FIG. 1 shows an embodiment of a block diagram of a system 100 for selecting an ad campaign (e.g., winning ad campaign) among advertising campaigns having different types of bid strategies in accordance with one embodiment. The ad system may include special purpose dedicated computers, which are designed or programmed to perform only advertising or publisher relating functions such as ad campaign functions and ad serving functions for serving in-application (in-app) ads to client devices.

The ad system 100 includes an advertising engine 130, processing logic 132, device profiles 134, storage medium 136, an adaptive decision unit 138, an auction system 190, an ad store 150, and a programmatic ad campaign framework 160 for providing programmatic creating and modification of ad campaigns (e.g., ad campaigns for delivering in-app video ads to mobile devices, ad campaigns for delivering in-app video ads to any type of device). The auction system 190 may be integrated with the ad system or separate from the ad system. The auction system 190 may include different types of auctions including cost-per-install (CPI), cost-per-completed-view (CPCV), cost-per-click (CPC), cost-per-mille (CPM), cost-per-action (CPA), second price auction, and an ad exchange auction. The system 100 provides advertising services for advertisers 184 to devices 102, 104, and 106 (e.g., source device, client device, mobile phone, tablet device, lap top, computer, connected or hybrid television (TV), IPTV, Internet TV, Web TV, smart TV, electronic displays or billboards, satellite device, satellite TV, automobile, airplane, smart appliance, etc.). A device profile for a device is based on one or more parameters including location (e.g., GPS coordinates, IP address, cellular triangulation, etc.) of the device, a social profile for a user of the device, and categories or types of applications installed on the device.

A targeting platform 161 includes different parameters for targeting users in ad campaigns and may include one or more performance based algorithms that utilized these different parameters for creating a performance based ad campaign. Alternatively, the performance based algorithms may be included in the ad engine 130 and obtain data from the targeting platform for creating a performance based ad campaign. The parameters include device characteristics (e.g., device id, device age, OS type, network connection for user's device, whether user's device is mobile device or tablet device, volume, screen size and orientation, language setting, etc.) and user characteristics (e.g., user spend, conversion rate, engagement rate, app type, in-app purchase (IAP) activity, etc.) from any source including the system 100, attributers 186, advertisers 184, and publishers 182. The conversion rate may be used to divide users into different groups based on the predicted conversion rate. A category conversion rate can indicate how likely a conversion occurs for a user with a particular app category (e.g., sports games, war games, quest games, news content apps, restaurant apps, entertainment apps, fashion apps, brand apps, etc.). An engagement rate indicates how engaged a user is with an ad in terms of cognitive (e.g., awareness, interest), physical (e.g., user-initiated transaction), and emotional factors. In one example, engagement with an ad video is measured in terms of play rate, playthrough rate, completion rates, video viewing time, and share rates. In another example, rich media engagement is measured in terms of display times, expansions, expansion times, interaction time and rate, form responses, game play, and share rates. In another example for mobile devices, engagement includes click to call, retail location, interaction rates, click to download, click to play, and share rates. An engagement rate is used to target users having a high ad engagement during ad play events. An app type may target users having competitor apps installed or users that have a particular "X" app installed. The competitor apps are competitors of publishers or developers that want to advertise to users of the competitor apps. The IAP activity targets users with IAP activity as indicated by user data from the system's 100 data pipeline.

Users with IAP activity can be separated into groups based on spend ranges (e.g., $10-50 range, $50-100 range, $100 or more range, etc.). The device age can be used to target new devices with respect to the system 100. Additional parameters include segments of users such as non-payers versus payers, social influence based on social media data, organic app installs, and life time value (LTV) of a user. The targeting platform is used to support advertisers with complex bid strategies for their user acquisition campaigns.

In one example, closing a video ad at an earliest opportunity can be interpreted as a negative emotion in regards to the video ad. A user's interaction with hardware (e.g., display device, motion device, gyroscope, accelerometer, smart watch, heart rate monitor, blood pressure sensor, etc.) may also be used to infer an emotional state of the user. For example, a user can interact with an interactive end card of an ad campaign by touching numerous touch points on a display device of a device to indicate an emotional state. A user can move the device in a certain shape or pattern that can be detected by a motion device.

An adaptive decision unit 138 includes adaptive decision algorithms that take into account numerous different variables (e.g., user ad engagement history, user app engagement history, user in-app purchase engagement history, user ad format engagement history, user ad placement engagement history, publishing application, location, volume settings, screen size, user demographic information, anonymous user information (e.g., clothes, vehicles, income), etc.) when making an ad campaign decision for obtaining a highly relevant ad campaign or content served in an optimal engaging manner at an appropriate time for a user. The ad campaign decision may include an appropriate placement of the opt-in ad interstitial in terms of an ad placement that is most likely to result in a conversion or user interaction with the opt-in ad interstitial.

The adaptive decision algorithms may be based on machine learning models that are located on prediction server(s) 162 for analysis and modeling. The machine learning models assign a value to each bid strategy of ad campaigns and convert each bid strategy into an effective CPM strategy. An ad campaign with a highest effective CPM can then be selected for delivery to a user's device.

Each device includes a respective advertising services software 103, 105, 107 (e.g., a software development kit (SDK)) that includes a set of software development tools for advertising services including in-app advertising services (e.g., advertising services delivered within mobile applications, advertising services delivered within non-web browser applications). In-app ad campaigns are ad campaigns (e.g., video ads) served to devices in-app (e.g., within mobile applications on a mobile device, within non-web browser software applications on a device, etc). The publishers 182 (or developers) publish content along with selling ad space to advertisers. Attributers 186 may install software (e.g., software development kits of publishers) on client devices and track user interactions with publisher and developer applications and advertisements. The attributers can then share this user data and device data with the system 100 and the appropriate publishers and advertisers. The system 100 uses this user and device data for analytics, data science, and return on investment advertising modeling. The system 100, devices 102, 104, 106, advertisers 184, publishers 182, attributers 186, and an ad exchange 195 with third party exchange participants communicate via a network 180 (e.g., Internet, wide area network, WiMax, satellite, cellular, IP network, etc.). The third party exchange participants can bid in real time or approximately in real time (e.g., 1 hour prior to an ad being played on a device, 15 minutes prior to an ad being played on a device, 1 minute prior to an ad being played on a device, 15 seconds prior to an ad being played on a device, less than 15 seconds prior to an ad being played on a device, less than 1 second prior to an ad being played on a device) using the auction system 190 to provide advertising services (e.g., an in-app video ad that includes a preview (e.g., video trailer) of an application, in-app ad campaigns for brand and performance advertisers) for the devices. The processing logic 132 may include a filtering functionality for filtering potential available ad campaigns, an optimizer functionality for determining an optimal ad campaign, and a selector (picker) functionality for selecting an optimal campaign. The filtering functionality may filter ad campaigns based on availability, device characteristics (e.g., device profiles 134), and user characteristics (e.g., age, gender, ethnicity, location, etc.), etc.

Advertisers 184 or publishers 182 (or developers) can programmatically access the programmatic ad campaign framework 160 for creating and modifying ad campaigns (e.g., ad campaigns for delivering video ads to mobile devices, ad campaigns for delivering video ads to any type of device) via a network 180. The ad campaign(s) are then delivered from any ad source to the targeted user devices (e.g., 102, 104, 106) via the network 180. The programmatic ad campaign framework 160 includes application programming interfaces (APIs) and implementing components. An API is a set of routines, protocols, and tools for building software applications. The API specifies how software components should interact. The Advertisers 184 or publishers 182 (or developers) obtain programmatic ad campaign software from the system 100 and then use this software for accessing the programmatic ad campaign framework 160. The programmatic ad campaign software sends functions calls with parameters to one or more APIs of the programmatic ad campaign framework 160. These APIs communicate with implementing software components of the framework 160. The implementing software components (e.g., software libraries) provide a set of functionalities for creating and modifying ad campaigns. The APIs then send function calls or responses to the programmatic ad campaign software of the advertisers or publishers via network 180. In this manner, the advertisers or publishers can programmatically create and modify ad campaigns using the ad system 100 which has improved computer functionality in the form of the programmatic ad campaign framework based on directly receiving input from the advertisers or publishers for creating a custom ad campaign.

In contrast, conventional ad campaigns are created with an advertiser or publisher talking with numerous ad sales, ad development, and ad creative staff for the ad system. The sales, ad development, and ad creative staff must then use different internal tools of the ad system to create the ad campaign for the advertiser or publisher. The advertiser or publisher then needs to review the created ad campaign and provide feedback for revisions of the ad campaign. The ad system works in a more efficient and streamlined manner based on the advertisers and publishers being able to directly access the ad tools of the ad system and create or modify their own custom ad campaigns in a time sensitive manner with minimal delay.

The programmatic ad campaign framework may include a targeting platform 161 that also provides advanced targeting as described herein for improved targeting computer functionality. The targeting platform 161 allows an advertising entity (e.g., advertiser, ad agency, publisher, developer, etc.) to utilize one or more performance based algorithms to more quickly locate and target users based on objectives of the ad campaign such as locating users having predicted life time values greater than a threshold life time value (LTV). High conversion users and high lifetime value users are examples of users having predicted life time values greater than a threshold LTV. High conversion users may convert more than a threshold conversion percentage (e.g., more than 10%, more than 30%, more than 50%, etc.) for an ad campaign. High lifetime value users are predicted to have a LTV greater than a threshold LTV (e.g., greater than $50, greater than $100, etc.) for an ad campaign. The targeting platform 161 can focus on more important parameters (e.g., high conversion users, high lifetime value users) and devalue or ignore other parameters to perform the processing operations in a shorter time period. Ad campaigns for delivering video ads to client devices via a network 180 can be adapted based on the engagement of the user. For example, a user that does not interact with an ad can be sent ads more frequently while a user that does interact with an ad can be sent ads less frequently.

In one embodiment, the system 100 includes a storage medium 136 to store one or more software programs. Processing logic (e.g., 132) is configured to execute instructions of at least one software program including executing the instructions to receive and process an ad request from a user's device upon initiation of a software application on the device, filter eligible ad campaigns, convert each bid strategy of the filtered ad campaigns into an effective cost-per-mille (CPM) strategy, compare effective CPM strategies for the filtered ad campaigns, and select an in-app ad campaign based on the comparison of the effective CPM strategies.

Figure 2:
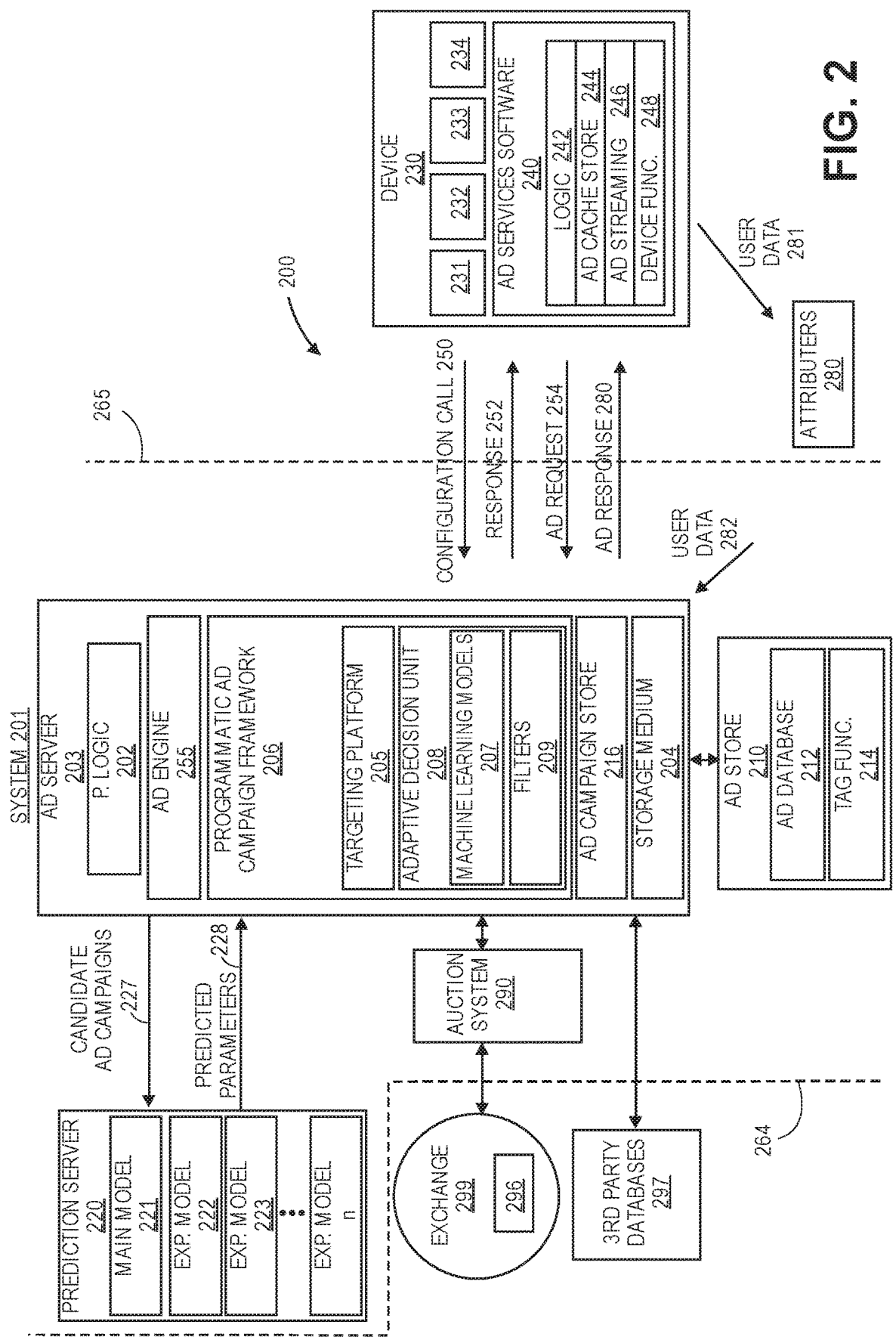
FIG. 2 illustrates a flow diagram of operations for selecting an ad campaign (e.g., a winning ad campaign) among advertising campaigns having different types of bid strategies in accordance with one embodiment.

FIG. 2 illustrates a flow diagram of operations for selecting an ad campaign (e.g., a winning ad campaign) among advertising campaigns having different types of bid strategies in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 200. The ad system 201, ad server 203, prediction server(s) 220 may include special purpose computers, which are designed or programmed to perform only advertising or publisher relating functions such as ad campaign functions and ad serving functions for serving ads to client devices. In one example, the vertical dashed lines 264 and 265 represent a separation of the components of the system 201 (e.g., ad server 203, auction system 290, ad store 210, prediction server 220) and components external to the system 201 (e.g., device 230, attributers 280, exchange 299, third party databases 297). The components of the system 201 communicate with the components external to the system via a network (e.g., network 180).

An advertising entity (e.g., advertiser, ad agency, publisher, developer, etc.) uses ad campaign software and a programmatic ad campaign framework 206 for creating and modifying advertising campaigns (e.g., ad campaigns for delivering video ads to mobile devices via a network, ad campaigns for delivering video ads to any type of device (e.g., source device, client device, mobile phone, tablet device, lap top, computer, connected or hybrid television (TV), IPTV, Internet TV, Web TV, smart TV, etc) via a network). The created ad campaign can be saved in the ad campaign store 216.

A targeting platform 205 may be integrated with the ad campaign framework 206 or separate from the ad campaign framework 206. The targeting platform includes different parameters for targeting users in ad campaigns and may include one or more performance based algorithms that utilize these different parameters for creating an ad campaign. Alternatively, the performance based algorithms may be located in the ad engine 255. For example, the ad campaign framework 206 may access data, parameters, or algorithms from the targeting platform or ad engine for creating and modifying ad campaigns. The parameters include device characteristics (e.g., device id, device age, OS type, network connection for user's device, whether user's device is mobile device or tablet device, volume, screen size and orientation, language setting, etc.) and user characteristics (e.g., user spend, conversion rate, engagement rate, app type, IAP activity, etc.) from any source including the system 100, attributers 186, advertisers 184, and publishers 182. Additional parameters include segments of users such as non-payers versus payers, social influence based on social media data, organic app installs, and life time value (LTV) of a user.

A device 230 (e.g., source device, client device, mobile phone, tablet device, lap top, computer, connected or hybrid television (TV), IPTV, Internet TV, Web TV, smart TV, etc) initiates a software application (e.g., at least one of software applications 231-234). For example, a user may select one of the software applications. The software applications may relate to different types or kinds of applications including gaming, entertainment, fashion, food, news, and brand applications. The advertising services software 240 is also initiated upon the initiation of one of the software applications. The advertising services software 240 may be associated with or embedded with the software applications. The advertising services software 240 may include or be associated with logic 242 (e.g., communication logic for communications such as an ad request), an ad cache store 244 for storing one or more ads or ad campaigns, ad streaming functionality 246 for receiving, optionally storing, and playing streamed ads, and device functionality 248 for determining device and connection capabilities (e.g., type of connection (e.g., 4G LTE, 3G, WiFi, WiMax, 5G, etc.), bandwidth of connection, location of device, type of device, display characteristics (e.g., pixel density, color depth), etc.). The initiated software application or advertising services software may have an ad play event for displaying or playing an ad on the display of the device. At operation 250, processing logic 202 of an ad server 204 of system 201 receives a configuration call from the device 230 upon the initiation of the software application and associated advertising services software 240. At operation 252, the processing logic 202 sends a response that includes at least one configuration file to the device 230 in response to the configuration call. The at least one configuration file includes different options for obtaining an ad to play for the ad play event. In one embodiment, a first option includes playing at least one ad that is cached on the device 230 during the ad play event. A second option includes planning to play at least one ad that is cached on the device 230 but asking for at least one better ad from the system 201. If the system 201 obtains and delivers at least one better ad in a timely manner (e.g., in time for a predicted ad play event, within a time period set by the at least one configuration file) then the at least one better ad will play during the predicted ad play event. The at least one better ad is expected to have a higher conversion rate or higher likelihood of obtaining a user interaction than the at least one cached ad. Otherwise, the cached ad is played. A third option includes planning to play at least one ad that is cached on the device 230 but asking for at least one better ad from the exchange 299. If the exchange 299 including third party databases 296 provides at least one better ad in a timely manner then the better ad will play during the ad play event. Otherwise, the cached ad is played. A fourth option includes planning to play at least one ad that is cached on the device 230 but asking for at least one better ad from the system 201 or the exchange 299. If the system 201 or the exchange 299 provide at least one better ad in a timely manner then the better ad will play during the ad play event. Otherwise, the cached ad is played.

A fifth option includes streaming at least one ad to be played during the predicted ad play event to the device 230. A sixth option includes planning to play at least one ad that is streamed to the device 230 but asking for at least one better ad from the system 201. If the system 201 provides the at least one better ad in a timely manner (e.g., in time for the ad play event, within a time period set by the configuration file) then the better ad will play during the ad play event. Otherwise, the planned streamed ad is played. A seventh option includes planning to play at least one ad that is streamed to the device 230 but asking for at least one better ad from the exchange 299. If the exchange 299 provides a better ad in a timely manner then the better ad will play during the ad play event. Otherwise, the planned streamed ad is played. An eighth option includes planning to play at least one ad that is streamed to the device 230 but asking for at least one better ad from the system 201 or the exchange 299. If the system 201 or the exchange 299 provide a better ad in a timely manner then the better ad will play during the predicted ad play event. Otherwise, the planned streamed ad is played. In others embodiments, the configuration file includes a subset of the options 1-8, additional options for obtaining at least one ad or ad campaign, or different options (e.g., options that include potential caching and streaming operations).

The configuration file can be altered by the system 201 or the device 230 without affected the advertising services software 240. In particular, the configuration file can be altered without affecting a version of the advertising services software 240 such that a user does not need to update a version of the advertising services software even if the configuration file changes. The system 201 is designed to deliver the most relevant and highest converting ads to devices using the configuration file.

At operation 254, prior to a predicted ad play event or an actual ad play event, the processing logic of the ad server optionally receives an ad request with a configurable option (e.g., options 1-8) of the at least one configuration file based on an anticipated ad play event occurring in the near future (e.g., 1 hr, 15 minutes, 60 seconds, 10 seconds, etc.). The ad request may be a predictive ad request if it occurs prior to a predicted ad play event. Alternatively, the ad server generates an ad request based on receiving the configuration call, which indicates that the user has initiated a software application and an anticipated ad play event will likely occurring in the near future even though no ad request is received from the device.

The ad request includes different types of information including publisher settings (e.g., a publisher of the selected software application), an application id to identify the selected software application, placement information for timing placement of an ad in-app (e.g., within mobile applications on a mobile device, within non-web browser software applications on a device, etc), user characteristics, device characteristics (e.g., device id, device age, OS type, network connection for user's device, whether user's device is mobile device or tablet device, volume, screen size and orientation, language setting, etc.), geographical data, location data, motion data (e.g., motion data from an accelerometer or gyroscope), language, time, application settings, demographic data for the user of the device, session data (e.g., how long a user has been using the selected application), and cache information. The ad server processes the ad request to determine an ad format and timing placement (e.g., an optimal ad format in terms of likelihood of converting, an optimal timing placement in terms of likelihood of converting) of at least one ad or interstitial ad played in-app within an initiated software application (e.g., any type of software application, non-web browser software applications) based on the information contained in the predictive ad request. The ad server determines an ad format and timing placement that is most likely to convert or generate revenue for a publisher or a developer.

Attributers 280 may have software (e.g., a SDK of the publisher of the application) installed on the user's device in order to obtain third party user data (e.g., user data 281 from the device 230). This user data may include tracking of a user's interaction and engagement with the software application, a length of time that the application is installed, an amount of purchases from the application, and buying patterns in terms of which products or services are purchased and when these products or services are purchased. The user data may also include monitoring target goals for how the user engages with the application. The user data (e.g., user data 282) can be shared with system 201, publishers, and advertisers via a network.

The ad server also processes the ad request (or predictive ad request) using the adaptive algorithms (e.g., machine learning models) of the adaptive decision unit 208 to determine an ad campaign for serving to the device. Filter logic 209 may include geo-location data and cost budgets of publishers for different bid strategies (e.g., CPM, CPC, CPI, CPA, CPCV, etc.). The filter logic filters eligible ad campaigns and selects more attractive ad campaigns that are more likely to cause user interaction, user engagement, convert, and generate more revenue. The selected ad campaigns are send to a data science pipeline that includes machine learning models 207 or other machine learning models. Alternatively, the machine learning models are located on prediction server(s) 220 for analysis and modeling. The machine learning models 207 or models of the prediction servers assign a value to each bid strategy and convert each bid strategy into an effective CPM strategy. For example, a CPI strategy is converted into a CPM strategy such that all bid strategies can be compared to each other in terms of effective CPM. The machine learning models build algorithms based on learned data rather than relying on explicitly programmed rules.

Figure 3:
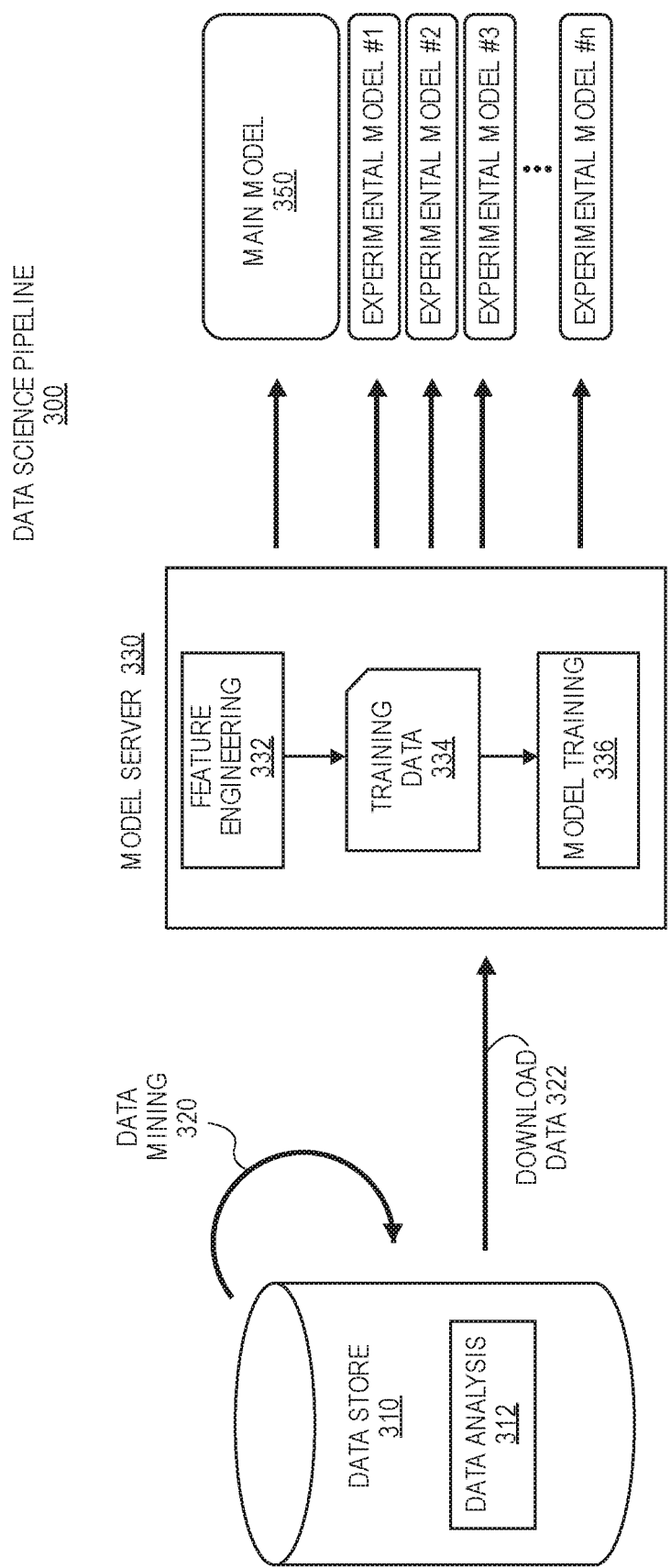
FIG. 3 illustrates a data science pipeline 300 in accordance with one embodiment.

FIG. 3 illustrates a data science pipeline 300 in accordance with one embodiment. The data science pipeline 300 includes a data store 310 for storing data. A data analysis tool 312 analyzes data that the system 201 or attributers or other third party databases provide to the data store 310. At operation 320, the data is mining using the data analysis tool and then sent to a model server 330 at operation download data 322. Feature engineering 332 applies features (e.g., advertiser app ID, device make, other apps installed, previous ad views, publisher ID), corresponding feature values (e.g., advertiser app name, manufacturer of device, at least 1 other app installed, at least 1 previous ad views, publisher name), and corresponding coefficients (e.g., 1.2, −2.09, −1.8, 1.1, −0.5) to data to generate training data 334 which is then used for model training 336. Models are then generated such as main model 350, experimental model #1, experimental model #2, experimental model #3, . . . , experimental model #n. The models include the set of coefficients for explaining (or weighting) the effect of each feature on a probability of conversion (or other performance parameter) for an ad or ad campaign. The features include device characteristics (e.g., make and model of a user's device, network connection for user's device, whether user's device is mobile device or tablet device, OS version, volume, screen size and orientation, language setting), geographical data, temporal data, frequency data (e.g., number of lifetime views of for an ad campaign, number of views across all of the application's campaigns, etc.), session data (e.g., publisher app site ID, ad position, incentivized placement), and user's behavioral data. The machine learning models may use a regression analysis based on these different data science features or parameters.

At operation 228, predicted parameters (e.g., predicted conversion rates for candidate ad campaigns) are provided by the machine learning model(s) of the prediction server(s) and sent to the ad server (or machine learning models 207 provide predicted parameters to ad server). The ad server (e.g., processing logic 202, adaptive decision unit 208)

selects an optimal ad campaign based on the predicted parameters (e.g., predicted conversion rates for candidate ad campaigns). The selected ad campaign is delivered to the device at operation 280. The ad campaign can be obtained from the ad server, an auction system 290, an ad exchange 299, third party databases 297, or an ad store 210.

Figure 4:
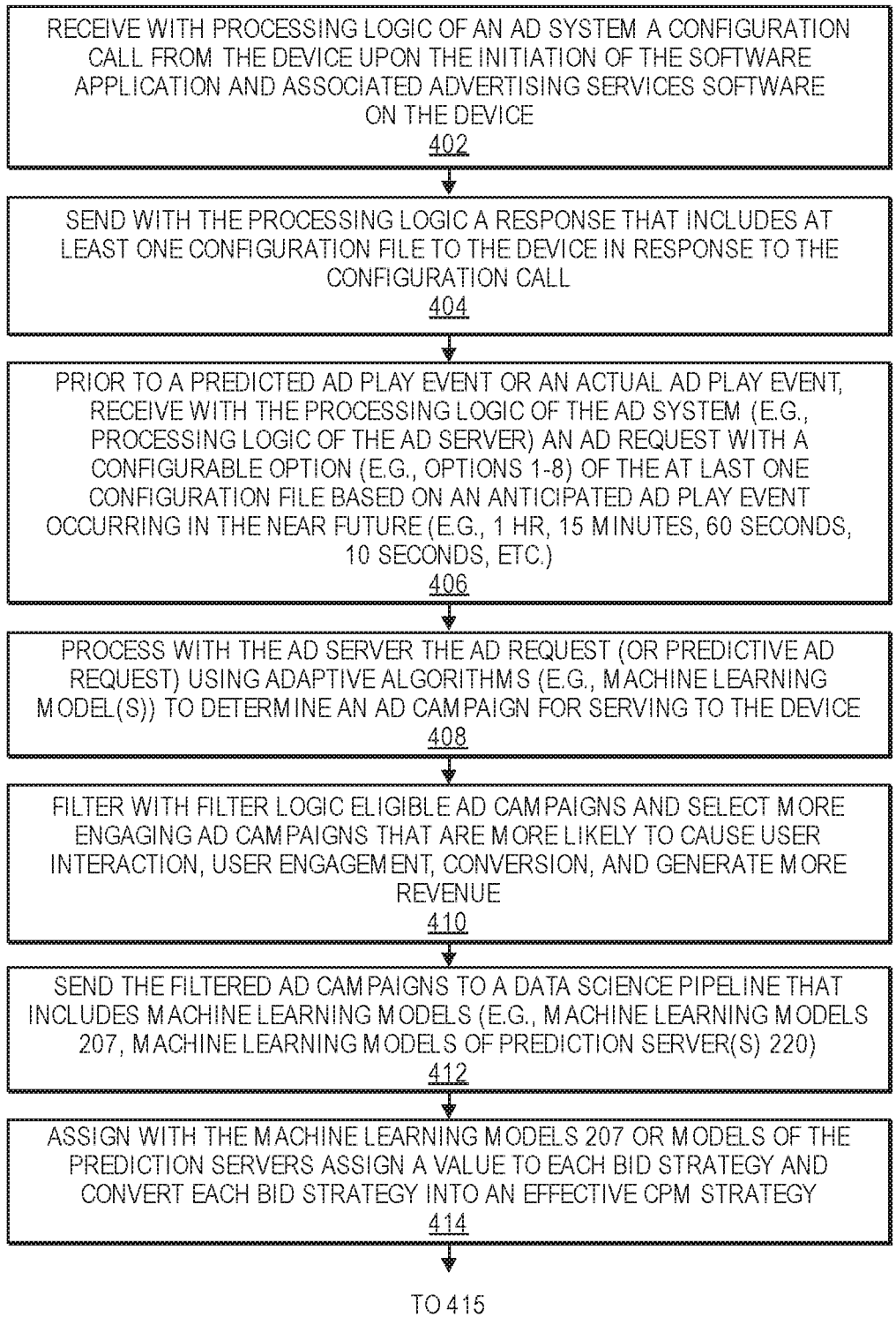
FIG. 4 illustrates a flow diagram of operations for a method of selecting an ad campaign (e.g., a winning ad campaign) among advertising campaigns having different types of bid strategies in accordance with one embodiment.
Figure 4:
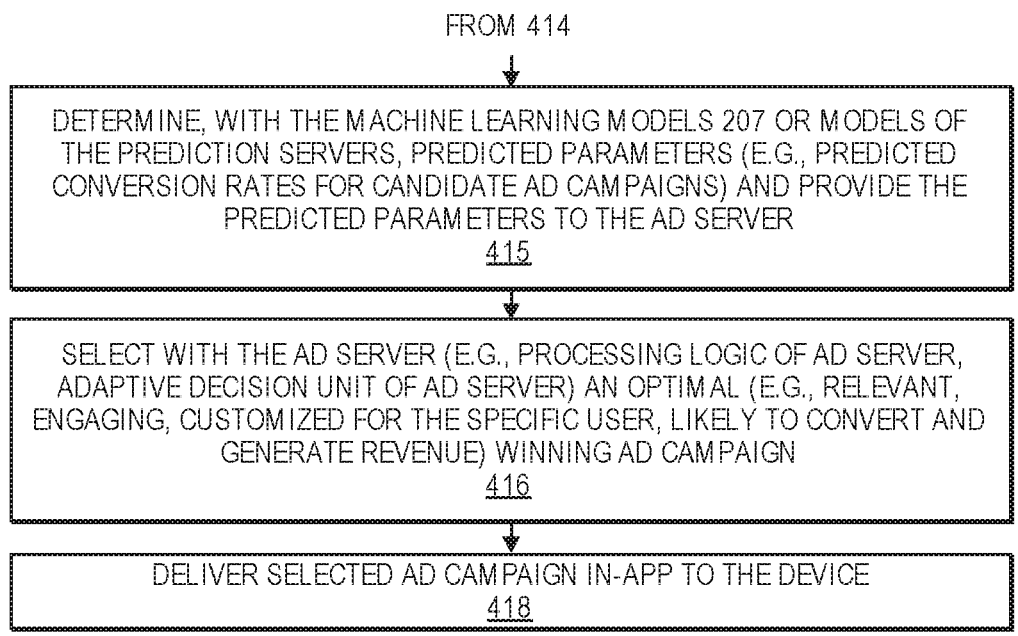

FIG. 4 illustrates a flow diagram of operations for a method of selecting an ad campaign (e.g., winning ad campaign) among advertising campaigns having different types of bid strategies in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 400 by executing instructions of at least one of processing logic of an ad server, an adaptive decision unit, and prediction server(s). The ad system, ad server, and prediction servers may include special purpose computers, which are designed or programmed to perform only advertising or publisher relating functions such as ad campaign functions, learning user behavior functions, and ad serving functions for serving ads to client devices. The ad system communicates with a device, attributers, an exchange, and a third party database via a network (e.g., network 180).

A device (e.g., source device, client device, mobile phone, tablet device, lap top, computer, connected or hybrid television (TV), IPTV, Internet TV, Web TV, smart TV, etc) initiates a software application (e.g., at least one of software applications 231-234). For example, a user may select one of the software applications. The advertising services software of the device is also initiated upon the initiation of one of the software applications. The advertising services software may be associated with or embedded with the software applications. In one embodiment, the advertising services software 240 may include or be associated with logic 242 (e.g., communication logic for communications such as an ad request), an ad cache store 244 for storing one or more ads or ad campaigns, ad streaming functionality 246 for receiving, optionally storing, and playing streamed ads, and device functionality 248 for determining device and connection capabilities (e.g., type of connection (e.g., 4G LTE, 3G, WiFi, WiMax, etc.), bandwidth of connection, location of device, type of device, display characteristics (e.g., pixel density, color depth), etc.). The initiated software application or advertising services software may have an ad play event for displaying or playing an ad in-app on the display of the device. At operation 402, processing logic of an ad system receives a configuration call from the device upon the initiation of the software application and associated advertising services software. At operation 404, the processing logic sends a response that includes at least one configuration file to the device in response to the configuration call. The at least one configuration file includes different options (e.g., options 1-8 as discussed herein) for obtaining an ad to play for the ad play event.

At operation 406, prior to a predicted ad play event or an actual ad play event, the processing logic of the ad system (e.g., processing logic of the ad server) receives an ad request with a configurable option (e.g., options 1-8) of the at least one configuration file based on an anticipated ad play event occurring in the near future (e.g., 1 hr, 15 minutes, 60 seconds, 10 seconds, etc.). The ad request may be a predictive ad request if it occurs prior to a predicted ad play event. Alternatively, the ad server generates an ad request based on receiving the configuration call, which indicates that the user has initiated a software application and an anticipated ad play event will likely occurring in the near future even though no ad request is received from the device.

At operation 408, the ad server processes the ad request (or predictive ad request) using adaptive algorithms (e.g., machine learning model 207) of the adaptive decision unit 208 to determine an ad campaign for serving to the device. Filter logic 209 of the adaptive decision unit may include geo-location data and cost budgets of publishers for different bid strategies (e.g., CPM, CPC, CPI, CPA, CPCV). At operation 410, the filter logic filters eligible ad campaigns and selects more engaging ad campaigns that are more likely to cause user interaction, user engagement, conversion, and generate more revenue. At operation 412, the filtered ad campaigns are send to a data science pipeline that includes machine learning models (e.g., machine learning models 207, machine learning models of prediction server(s) 220). At operation 414, the machine learning models 207 or models of the prediction servers assign a value to each bid strategy and convert each bid strategy into an effective CPM strategy. For example a CPI strategy is converted into a CPM strategy such that all bid strategies can be compared to each other in terms of effective CPM. In another embodiment, each bid strategy is converted into a different specific type of effective bid strategy. At operation 415, the machine learning models 207 or models of the prediction servers determine predicted parameters (e.g., predicted conversion rates for candidate ad campaigns) and provide the predicted parameters to the ad server.

At operation 416, an optimal (e.g., relevant, engaging, customized for the specific user, likely to convert and generate revenue) winning selected ad campaign is selected by the ad server (e.g., processing logic of ad server, adaptive decision unit of ad server). The selected ad campaign is delivered to the device via a network at operation 418.

In one example, a publisher set a price floor of $5 for different types of advertiser bid strategies. Different types of bid strategies are converted into an effective CPM and then compared to each other. An ad cost of an advertiser per 1000 views determines CPM. An ad cost of $10 per 1000 views equals a $10 CPM.

The machine learning models 207 or models of the prediction server(s) learn how to predict conversion rates which is then used for selecting more relevant and engaging ad campaigns based on data from first party and third party databases. The data may include user data and characteristics that allow for an engaging customized user experience. For example, performance parameters of a specific ad campaign is predicted for an ad play event within a specific app of a publisher for a specific user. Thus, the prediction server(s) provide an improved computer functionality for the ad system being able to quickly in real time (e.g., just prior to an ad play event) deliver engaging in-app ad campaigns to the user's device (without providing non-engaging ads). The publishers, developers, or advertisers are able to target valuable users in less time who are predicted to be engaged with the ad, interested in the product or service of the ad, and convert. Fewer ad campaigns need to be sent to a user because the user is interested and engaged in the ad campaigns selected by the machine learning models. This reduces ad system processing time, device processing time, and network delays in delivering engaging ad campaigns to a user. The user experience on a client device is enhanced by receiving fewer and more engaging ad campaigns.

FIG. 5 illustrates an exemplary candidate ad campaign list for performance based ads in accordance with one embodiment. The candidate ad campaign list 500 is generated by data science after eligible ad campaigns are filtered. The candidate ad campaign list 500 includes ad campaigns 510, 520, and 530. Each ad campaign is associated with a CPI bid, a predicted conversion rate, and an effective CPM (eCPM) which is approximately cost per 800 views.

In one embodiment, ad campaign 510 has a CPI bid of $1.50, a predicted conversion rate 512, and an eCPM 514. Ad campaign 520 has a CPI bid of $2.00, a predicted conversion rate 522, and an eCPM 524. Ad campaign 530 has a CPI bid of $2.50, a predicted conversion rate 532, and an eCPM 534. The machine learning models predict a predicted conversion rate for each ad campaign based on different parameters including user characteristics (e.g., user spend, user conversion rate, user engagement rate during ad play events (e.g., play rate, playthrough rate, completion rates, video viewing time, and share rates), app type, IAP activity, etc.), behavior data (e.g., previous app installs, time of last app install, amount of user time spend in applications, etc.) and device characteristics (e.g., make and model of a user's device, network connection for user's device, whether user's device is mobile device or tablet device, OS version, volume, screen size and orientation, language setting). In this manner, a conversion rate (or other performance parameters) is predicted for a specific ad campaign to be played during a specific application of a publisher for a specific user. In one example, the machine learning models assign a weighted value to each parameter for each ad campaign for each user. In one example, the predicted conversion rate 512 is 0.48% which results in an eCPM of $7.20 for the ad campaign 510. The predicted conversion rate 522 is 0.19% which results in an eCPM of $3.80 for the ad campaign 520. The predicted conversion rate 532 is 0.24% which results in an eCPM of $6.00 for the ad campaign 530. Thus, in this example, the machine learning model(s) (e.g., main model, experimental model(s)) provide the predicted conversion rates and the ad server will select the ad campaign 510 because it has the highest eCPM of $7.20.

FIG. 6 illustrates an exemplary candidate ad campaign list for different types of performance based bid strategies in accordance with one embodiment. The candidate ad campaign list 600 is generated by data science after eligible ad campaigns are filtered. The candidate ad campaign list 600 includes ad campaigns 610, 620, and 630. Each ad campaign is associated with a different bid strategy with each bid type being converted into an eCPM. In one embodiment, ad campaign 610 has a CPI bid of $1.50, a predicted conversion rate 612, and an eCPM of $7.20. Ad campaign 620 has a CPM bid of $0.0008, a predicted conversion rate does not apply for CPM, and an eCPM of $8.00. Ad campaign 630 has a CPCV bid of $0.01, a predicted conversion rate 632, and an eCPM of $7.20. The machine learning models predict the predicted conversion rate for each CPI and CPCV ad campaign for each user based on different parameters including user engagement, previous app installs, and device settings or characteristics. In one example, the predicted conversion rate 612 for a specific user is 0.48% and the predicted conversion rate 632 is 72%. The machine learning models assign a weighted value to each parameter for each ad campaign for a specific user. Thus, for this example, the machine learning model(s) (e.g., main model, experimental model(s)) determine predicted conversion rates and the ad server will select the ad campaign 620 because it has the highest eCPM of $8.00 for a specific user or group of users having similar characteristics.

Figure 7:
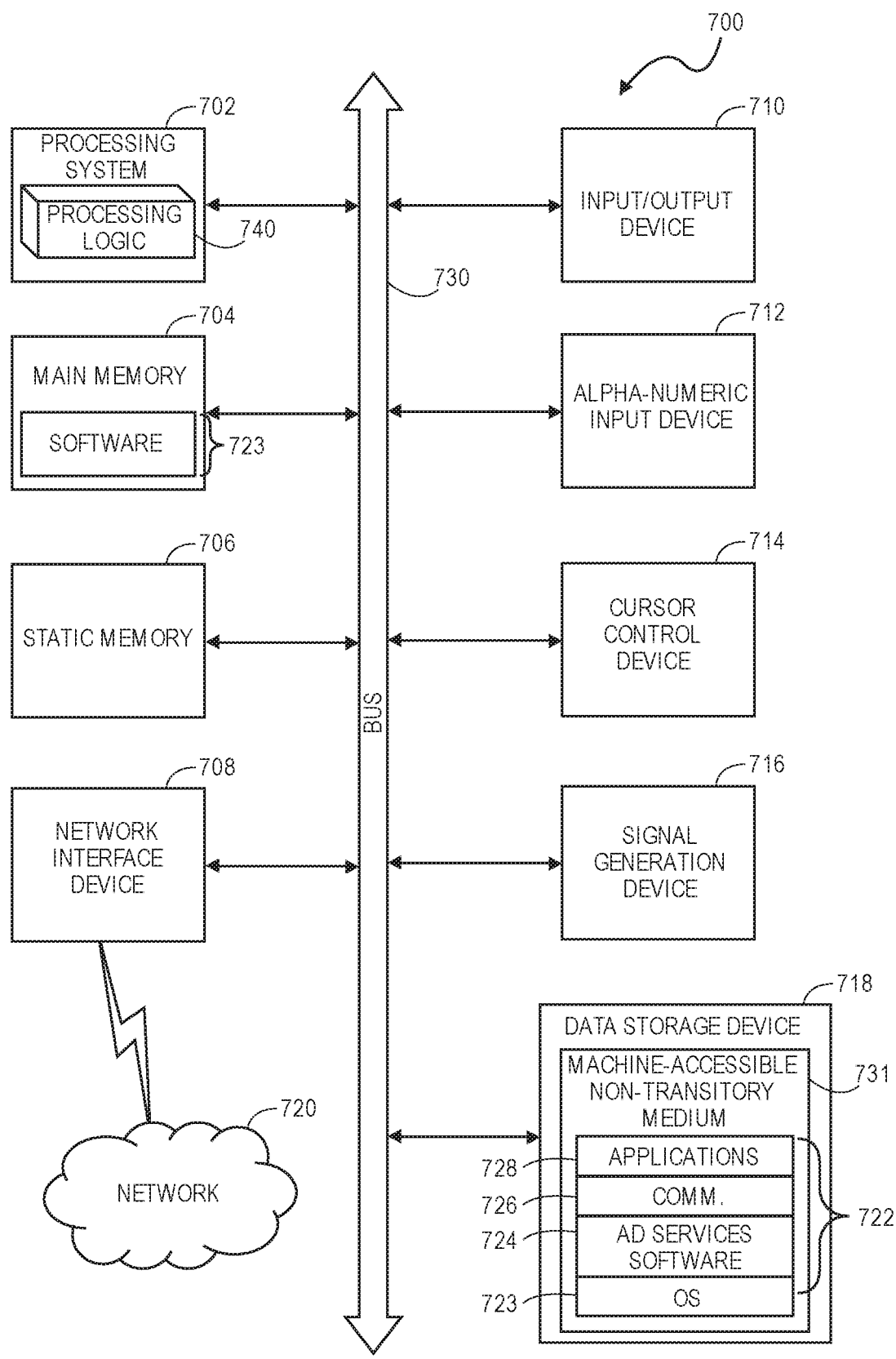
FIG. 7 illustrates a diagrammatic representation of a machine in the exemplary form of a device 700 within which a set of instructions, for causing the machine to perform any one or more of the methodologies discussed herein, may be executed in accordance with one embodiment.

FIG. 7 illustrates a diagrammatic representation of a machine in the exemplary form of a computer system or device 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server (e.g., ad system 100, ad system 201, ad server 203, prediction server(s) 220) or a client machine (e.g., device 230) in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 700 includes a processing system 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing system 702 represents one or more general-purpose processing devices such as one or more microprocessors, central processing units, or the like. More particularly, the processing system 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system 702 may be one or more special-purpose processing devices such as an application specific integrated circuit (ASIC), a field programmable gate array (FPGA), a digital signal processor (DSP), network processor, or the like. The processing system 702 is configured to execute the processing logic 740 (e.g., processing logic 132, logic 242, processing logic 202, processing logic of prediction server(s) 220) for performing the operations and steps discussed herein.

The device 700 may further include a network interface device 708 that may include RF circuitry for sending and receiving RF cellular signals, a wireless transceiver for WiFi, a USB component, a NFC component, or any other communications component for sending and receiving communications. The device 700 also may include an input/output device 710 (e.g., a display, a liquid crystal display (LCD), a plasma display, a cathode ray tube (CRT), touch display device, or touch screen for receiving user input and displaying output), an optional alphanumeric input device 712 (e.g., a keyboard), an optional cursor control device 714 (e.g., a mouse), and a signal generation device 716 (e.g., a speaker).

The data storage device 718 (e.g., storage medium 136, storage medium 204, storage medium of prediction server (s), storage medium of device 230) may include a machine-accessible non-transitory medium 731 on which is stored one or more sets of instructions (e.g., software 722) embodying any one or more of the methodologies or functions described herein. The software 722 may include an operating system 723, advertising services software 724 (e.g., SDK 724, ad services software 240, instructions or software of ad system 100, instructions or software of ad system 201, instructions or software of prediction server(s) 220), communications module 726, and applications 728 (e.g., publisher applications). The software 722 may also reside, completely or at least partially, within the main memory 704 (e.g., software 723) and/or within the processing system 902 during execution thereof by the device 700, the main memory 704 and the processing system 902 also constituting machine-accessible storage media. The software 722 or 723 may further be transmitted or received over a network 720 via the network interface device 708.

The device may include special purpose computers, which are designed or programmed with advertising services software to perform only advertising or publisher relating functions such as extracting, saving, and transmitting user data to the ad system, receiving and displaying ad campaigns within publisher applications on the device.

The machine-accessible non-transitory medium 731 may also be used to store data structure sets that define user identifying states and user preferences that define user profiles. Data structure sets and user profiles may also be stored in other sections of device 700, such as static memory 706.

Figure 8:
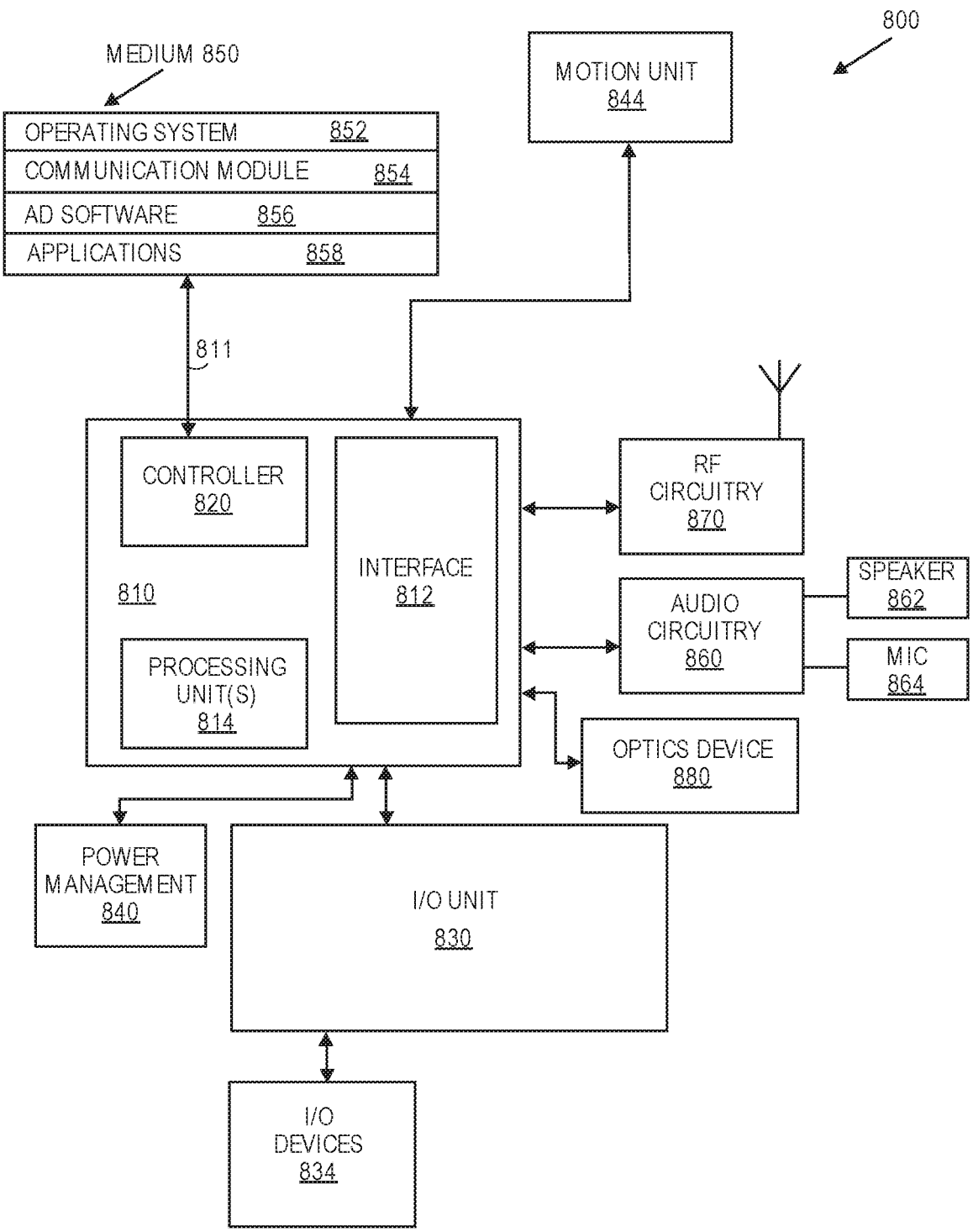
FIG. 8 is a block diagram of a wireless device 800 in accordance with one embodiment.

FIG. 8 is a block diagram of a wireless device 800 in accordance with one embodiment. The wireless device 800 (e.g., device 230) may be any type of wireless device (e.g., cellular phone, wireless phone, tablet, etc.) for sending and receiving wireless communications. The wireless device includes a processing system 810 that includes a controller 820 and processing units 814. The processing system 810 communicates with an Input/Output (I/O) unit 830, radio frequency (RF) circuitry 870, audio circuitry 860, an optics device 860 for capturing one or more images or video, a motion unit 844 (e.g, an accelerometer, gyroscope, etc.) for determining motion data (e.g., in three dimensions) for the wireless device 800, power management system 840, and machine-accessible non-transitory medium 850. These components are coupled by one or more communication links or signal lines.

RF circuitry 870 is used to send and receive information over a wireless link or network to one or more other devices. Audio circuitry 860 is coupled to audio speaker 862 and microphone 864 and includes known circuitry for processing voice signals.

One or more processing units 814 communicate with one or more machine-accessible non-transitory mediums 850 (e.g., computer-readable medium) via controller 820. Medium 850 can be any device or medium (e.g., storage device, storage medium) that can store code and/or data for use by one or more processing units 814. Medium 850 can include a memory hierarchy, including but not limited to cache, main memory and secondary memory. The medium 850 stores one or more sets of instructions (or software) embodying any one or more of the methodologies or functions described herein. The software may include an operating system 852, advertising services software 856 (e.g., SDK 856, ad services software 240), communications module 854, and applications 858 (e.g., publisher applications, developer applications, a web browser, html5 applications, etc.). The software may also reside, completely or at least partially, within the medium 850 or within the processing units 814 during execution thereof by the device 800. The components shown in FIG. 8 may be implemented in hardware, software, firmware or any combination thereof, including one or more signal processing and/or application specific integrated circuits.

Communication module 854 enables communication with other devices. The I/O unit 830 communicates with different types of input/output (I/O) devices 834 (e.g., a display, a liquid crystal display (LCD), a plasma display, a cathode ray tube (CRT), touch display device, or touch screen for receiving user input and displaying output, an optional alphanumeric input device).

The device 800 may include special purpose computers, which are designed or programmed with advertising services software to perform only advertising or publisher relating functions such as extracting, saving, and transmitting user data to the ad system and receiving and displaying ad campaigns within publisher applications on the device.

In one embodiment, a machine-accessible non-transitory medium contains executable computer program instructions which when executed by a data processing system cause the system to perform any of the methods discussed herein. While the machine-accessible non-transitory medium 850 is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

In one embodiment, an advertising system designed for selecting relevant and engaging ad campaigns for delivering in-app to a device of a user includes an adaptive decision unit having filter logic for filtering eligible ad campaigns, a storage medium to store instructions of the system, and processing logic coupled to the storage medium. The processing logic is configured to execute the instructions of the system to receive and process an ad request from the device upon initiation of a software application on the device, filter eligible ad campaigns with filter logic, convert each bid strategy of the filtered ad campaigns into an effective cost-per-mille (CPM) strategy, compare effective CPM strategies for the filtered ad campaigns, and select an ad campaign based on the comparison of the effective CPM strategies.

In one embodiment, the processing logic is further configured to execute the instructions of the system to generate an ad response that includes the selected ad campaign and send the ad response to the device for display on the device in-app during an ad play event of the initiated software application.

In one example, the filter logic of the adaptive decision unit includes geo-location data and cost budgets of publishers for different bid strategies including CPM, cost-per-click (CPC), cost-per-install (CPI), cost-per-action (CPA), and cost-per-completed-view (CPCV) of ad campaigns.

In one embodiment, at least one prediction server stores a plurality of machine learning models including a machine learning model that assigns a weighted value for different parameters of a plurality of bid strategies of the filtered ad campaigns, determines a predicted conversion rate for a plurality of filtered ad campaigns based on the different parameters, and converts each bid strategy into an effective CPM strategy.

In one embodiment, the different parameters include user characteristics for the user including user engagement rate during ad play events and behavior data including previous app installs and a time of last app install for the user.

The different parameters further include device characteristics of the device including make and model of the user's device, network connection for the user's device, volume, screen size, and display orientation of the user's device.

In one embodiment, a machine-accessible non-transitory medium containing executable computer program instructions which when executed by an ad system cause the ad system to perform a method for delivering an ad campaign to a device of a user. The method includes receiving, with processing logic of the ad system, an ad request from a device upon initiation of a software application on the device, processing the ad request, filtering eligible ad campaigns and associated bid strategies to generate filtered ad campaigns, converting each bid strategy of the filtered ad campaigns into an effective cost-per-mille (CPM) strategy, comparing effective CPM strategies for the filtered ad campaigns, and selecting an ad campaign from the filtered ad campaigns based on the comparison of the effective CPM strategies.

In one embodiment, the method further includes generating an ad response that includes the selected ad campaign and sending the ad response to the device for display on the device in-app during an ad play event.

The method further includes filtering eligible ad campaigns and associated bid strategies to generate filtered ad campaigns includes determining geo-location data and cost budgets of publishers for different bid strategies of the eligible ad campaigns including CPM, cost-per-click (CPC), cost-per-install (CPI), cost-per-action (CPA), and cost-per-completed-view (CPCV).

In one example, the method further includes storing with at least one prediction server a plurality of machine learning models, assigning with a machine learning model a weighted value for different parameters of a plurality of bid strategies of the filtered ad campaigns, determining a predicted conversion rate for the plurality of filtered ad campaigns based on the different parameters, and converting each bid strategy into an effective CPM strategy.

In one example, the different parameters include user characteristics for the user including user engagement rate during ad play events and behavior data including previous app installs and a time of last app install for the user.

The different parameters further include device characteristics of the device including make and model of the user's device, network connection for the user's device, volume, screen size, and display orientation of the user's device.

In one embodiment, a device (e.g., device 230, device 900, device 800) for displaying an ad campaign includes a storage medium to store instructions of advertising services software, and processing logic coupled to the storage medium. The processing logic is configured to execute the instructions of the advertising services software to generate an ad request in response to initiation of a software application on the device, send the ad request to an ad system, and receive an ad response that includes a selected ad campaign to be displayed on the device during an ad play event of the software application.

In one example, the ad request includes different types of information including publisher settings for a publisher of the initiated software application, an application id to identify the selected software application, user characteristics including user engagement rate during ad play events, and device characteristics including a device id and geographical data.

At least one of the device or an ad system filters eligible ad campaigns, converts each bid strategy of the filtered ad campaigns into an effective cost-per-mille (CPM) strategy, compares effective CPM strategies for the filtered ad campaigns, and selects an ad campaign based on the comparison of the effective CPM strategies.

In one embodiment, the ad campaign is selected based on the different types of information of the ad request including publisher settings for a publisher of the initiated software application, an application id to identify the selected software application, user characteristics including user engagement rate during ad play events, and device characteristics including a device id and geographical data.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A system, comprising:
an ad server having a processing system that is configured to execute instructions to receive and process an ad request from a wireless device upon initiation of a software application on the wireless device, filter eligible ad campaigns, compare effective cost-per-mille CPM strategies with predicted conversion rates for the filtered ad campaigns, select and transmit an ad campaign in real time prior to an ad play event on the wireless device based on the comparison of the effective CPM strategies and the predicted conversion rates; and
an adaptive decision unit coupled to the processing system, the adaptive decision unit including a data science pipeline to utilize feature engineering to apply features, corresponding feature values, and corresponding coefficients to data to generate training data, which is used for model training to generate a plurality of machine learning models that build algorithms based on learned data for predicting conversion rates of ad campaigns, wherein the data science pipeline to receive the filtered eligible ad campaigns, to assign with a machine learning model coefficients for different parameters of a plurality of bid strategies of the received filtered ad campaigns including a first coefficient for a type and model of the wireless device, a second coefficient for a type of operating system on the wireless device, and a third coefficient for a volume setting on the wireless device, to determine a predicted conversion rate for each filtered ad campaign based on the coefficients of the different parameters as applied to the machine learning model, and to convert each bid strategy including a cost per install (CPI) into an effective CPM strategy.

2. The system of claim 1, wherein the processing system is further configured to execute instructions to:
generate an ad response that includes the selected ad campaign; and send the ad response to the wireless device in real time just prior to an ad play event for a video ad for display on the wireless device in-application (in-app) of the software application during the ad play event.

3. The system of claim 1, wherein the ad server includes geo-location data and cost budgets of publishers for different bid strategies including CPM, cost-per-click (CPC), cost-per-install (CPI), cost-per-action (CPA), and cost-per-completed-view (CPCV).

4. The system of claim 1, wherein the different parameters include user characteristics for the user including user engagement rate during ad play events and behavior data including previous app installs and a time of last app install for the user.

5. The system of claim 4, wherein the different parameters further include device characteristics of the wireless device including make and model of the user's wireless device, network connection for the user's wireless device, volume, screen size, and display orientation of the user's wireless device.

6. A computer-implemented method for delivering an ad campaign to a wireless device, the method comprising:
receiving, with a processing system of the ad system, an ad request from a wireless device upon initiation of a software application on the wireless device;
processing the ad request;
filtering, with filter logic, eligible ad campaigns and associated bid strategies to generate filtered ad campaigns;
utilizing feature engineering to apply features, corresponding feature values, and corresponding coefficients to data to generate training data, which is used for model training to generate a plurality of machine learning models that build algorithms based on learned data for predicting conversion rates of ad campaigns;
assigning with a machine learning model coefficients for different parameters of a plurality of bid strategies of the filtered ad campaigns including a first coefficient for a type and model of the wireless device, a second coefficient for a type of operating system on the wireless device, and a third coefficient for a volume setting on the wireless device;
determining a predicted conversion rate for each filtered ad campaign based on the coefficients of the different parameters as applied to the machine learning model; and
converting each bid strategy including a cost per install (CPI) into an effective cost-per-mille (CPM) strategy.

7. The computer-implemented method of claim 6, further comprising:
converting each bid strategy of the filtered ad campaigns into an effective cost-per-mille (CPM) strategy;
comparing effective CPM strategies with the predicted conversion rates for the filtered ad campaigns; and
selecting and transmitting an ad campaign to the wireless device in real time just prior to an ad play event on the wireless device from the filtered ad campaigns based on the comparison of the effective CPM strategies and the predicted conversion rates.

8. The computer-implemented method of claim 6, wherein filtering eligible ad campaigns and associated bid strategies to generate filtered ad campaigns includes determining geo-location data and cost budgets of publishers for different bid strategies of the eligible ad campaigns including CPM, cost-per-click (CPC), cost-per-install (CPI), cost-per-action (CPA), and cost-per-completed-view (CPCV).

9. The computer-implemented method of claim 6, wherein the different parameters include user characteristics for the user including user engagement rate during ad play events and behavior data including previous app installs and a time of last app install for the user.

10. The computer-implemented method of claim 9, wherein the different parameters further include device characteristics of the wireless device including make and model of the user's wireless device, network connection for the user's wireless device, volume, screen size, and display orientation of the user's wireless device.

11. A wireless device for displaying an ad campaign, comprising:
a display device for receiving touch user input of a user and displaying output;
a storage medium to store an operating system, ad software, and applications; and
a processing unit coupled to the storage medium, the processing unit is configured to execute instructions to generate an ad request in response to initiation of a software application on the wireless device and initiation of the ad software, send the ad request to an ad system, and receive an ad response in real time prior to an ad play event for a video ad with the ad response including a selected ad campaign to be displayed on the display device in-application (in-app) during the ad play event of the software application, wherein the ad request includes different types of information including publisher settings for a publisher of the initiated software application, an application id to identify the selected software application, and user characteristics including user engagement rate during ad play events, wherein the wireless device comprises a mobile device or a tablet device, wherein the selected ad campaign is selected based on device characteristics including a network connection for the wireless device, operating system version, volume, screen size and orientation, and a type and model of the wireless device.

12. The wireless device of claim 11, wherein at least one of the wireless device or the ad system filter eligible ad campaigns, convert each bid strategy of the filtered ad campaigns into an effective cost-per-mille (CPM) strategy, store a plurality of machine learning models that build algorithms based on learned data for predicting conversion rates of ad campaigns, assign with a machine learning model weighted values for different parameters of a plurality of bid strategies of the received filtered ad campaigns including a first weighted value for a type and model of the wireless device, a second weighted value for a type of operating system on the wireless device, and a third weighted value for a volume setting on the wireless device, determine predicted conversion rates for the filtered ad campaigns based on the weighted values of the different parameters as applied to the machine learning model, and compare effective CPM strategies with the predicted conversion rates for the filtered ad campaigns.

13. The wireless device of claim 12, wherein at least one of the wireless device or the ad system select an ad campaign based on the comparison of the effective CPM strategies and the predicted conversion rates.

14. The wireless device of claim 11, wherein the ad campaign is selected based on the different types of information of the ad request including publisher settings for a publisher of the initiated software application, an application id to identify the selected software application, user characteristics including user engagement rate during ad play events, and device characteristics including a device id and geographical data.

* * * * *